(12) United States Patent
Polley

(10) Patent No.: US 7,445,833 B2
(45) Date of Patent: *Nov. 4, 2008

(54) ERGONOMIC FLOOR MAT

(75) Inventor: John W Polley, River Forest, IL (US)

(73) Assignee: Ergotech Solutions, Inc., Elgin, IL (US)

( * ) Notice: Subject to any disclaimer, the term of this patent is extended or adjusted under 35 U.S.C. 154(b) by 114 days.

This patent is subject to a terminal disclaimer.

(21) Appl. No.: 11/279,662

(22) Filed: Apr. 13, 2006

(65) Prior Publication Data

US 2006/0172122 A1    Aug. 3, 2006

Related U.S. Application Data

(63) Continuation-in-part of application No. 09/973,298, filed on Oct. 9, 2001, now Pat. No. 7,192,631.

(51) Int. Cl.
| | |
|---|---|
| *B32B 1/00* | (2006.01) |
| *B32B 3/12* | (2006.01) |
| *B32B 3/00* | (2006.01) |
| *A47K 7/02* | (2006.01) |
| *A47G 9/06* | (2006.01) |

(52) U.S. Cl. ........................... 428/178; 428/71; 428/72; 15/215; 15/216; 5/420

(58) Field of Classification Search ................ 428/178, 428/72, 71; 15/215–217; 5/417, 420

See application file for complete search history.

(56) References Cited

U.S. PATENT DOCUMENTS

| | | |
|---|---|---|
| 2,843,868 A | 7/1958 | Borgstrom |
| 3,083,393 A | 4/1963 | Nappi |
| 3,846,945 A | 11/1974 | Roby |
| 4,147,825 A * | 4/1979 | Talalay ........................ 428/138 |
| 4,328,275 A | 5/1982 | Vargo |

(Continued)

OTHER PUBLICATIONS

Sealed Air Corporation, Company History, downloaded Sep. 23, 2001, www.sealedair.com, pp. 1-8.

(Continued)

*Primary Examiner*—Keith D. Hendricks
*Assistant Examiner*—Catherine A. Simone
(74) *Attorney, Agent, or Firm*—Fraser Clemens Martin & Miller LLC; William J. Clemens

(57) ABSTRACT

An ergonomic floormat has particular utility as a surgical mat to decrease musculoskeletal fatigue in humans during prolonged static postural stress, as occurs during standing. The floormat is constructed in a laminated fashion utilizing bubble shaped closed cellular materials, closed cellular polyethylene foam materials and/or closed cellular polypropylene foam materials. The design provides an ergonomically, non-compressible mat, which offers high support and high Indent Force Deflection. In a preferred embodiment, the mat is designed for single use only and is completely disposable. Additional features of the mat include being water repellant, anti-static and an anti-skid bottom surface of a low-tack, adhesive material to allow for greater securement to the surgical floor and to prevent slippage. While the floormat is designed with particular application for the operating theatre, it may find use in consumer and industrial situations as well, where a disposable mat is desired for maximum ergonomic and anti-fatigue properties.

20 Claims, 4 Drawing Sheets

U.S. PATENT DOCUMENTS

| | | |
|---|---|---|
| 4,356,642 A | 11/1982 | Herman |
| 4,574,101 A | 3/1986 | Tricca et al. |
| 4,609,580 A | 9/1986 | Rockett et al. |
| 4,614,679 A | 9/1986 | Farrington, Jr. et al. |
| 4,644,592 A | 2/1987 | Small |
| 4,822,669 A | 4/1989 | Roga |
| 4,981,544 A | 1/1991 | Nordale |
| 5,028,468 A | 7/1991 | Taylor |
| 5,173,346 A | 12/1992 | Middleton |
| 5,236,753 A | 8/1993 | Gaggero et al. |
| 5,274,846 A | 1/1994 | Kolsky |
| 5,383,570 A | 1/1995 | Gordon |
| 7,192,631 B2 * | 3/2007 | Polley .......................... 428/68 |

OTHER PUBLICATIONS

Sealed Air Corporation, Sealed Air Corporation Introduces Cellu-Cushion®—NS Polyethylene Foam, downloaded Sep. 23, 2001, www.sealedair.com, pp. 1-2.

Scott Williams, Ethafoam and Other Polyethylene Foams in Conservation, downloaded Sep. 23, 2001, http://palimpsest.stanford.edu/byauth/williams/foam.html, pp. 1-4.

Sealed Air Corporation, Air Cap® Barrier-Sealed Bubble Packaging, downloaded Sep. 23, 2001, from www.sealedair.com, 8 pages.

Knox & Schneider Incorporated, Products, downloaded Sep. 23, 2001, www.knoxandschneider.com, pp. 1-3.

Marfred Industries, Astro-Bubble, www.marfred.com, downloaded Sep. 23, 2001, pp. 1-3.

Cleansweep Supply, Inc., MicroFoam® Packaging Material downloaded Sep. 23, 2001, 1 page.

* cited by examiner

Fig. 5 "Bottoming Out", Minimal Anti-Fatigue Relief (76%-100% Deflection)
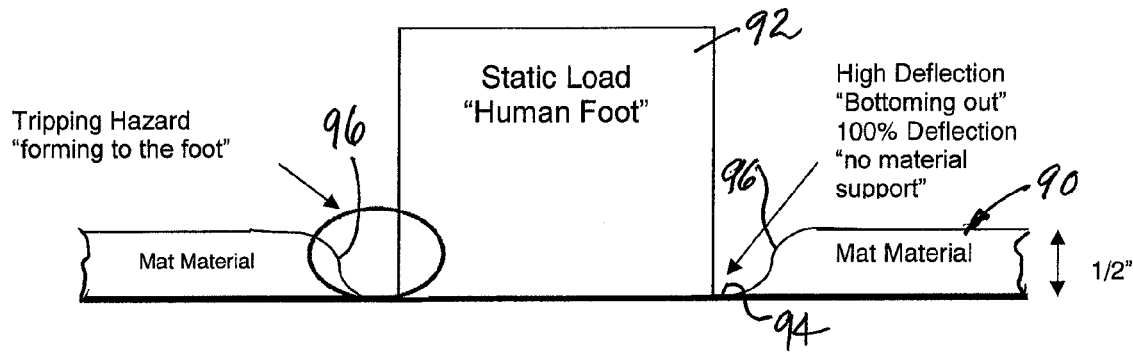
Fig. 6 "Minimal Deflection", Minimal Anti-Fatigue Relief (0%-29% Deflection)
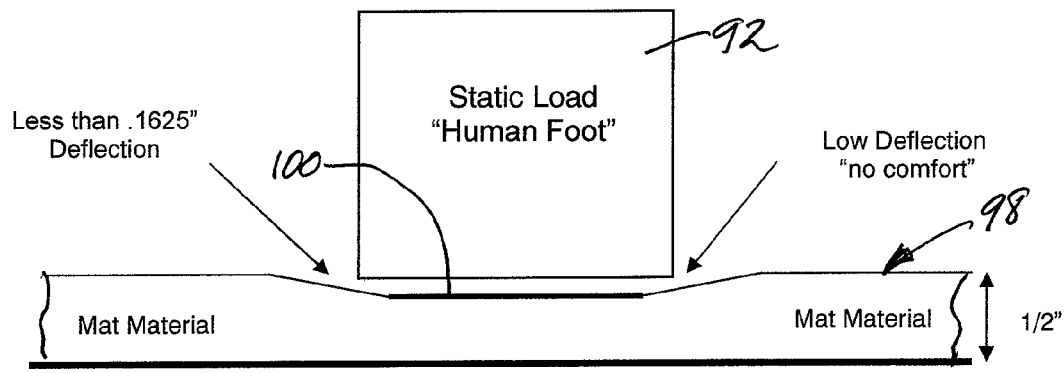
Fig. 7 "Proper Loading", Maximum Anti-Fatigue Relief (30%-75% Deflection)
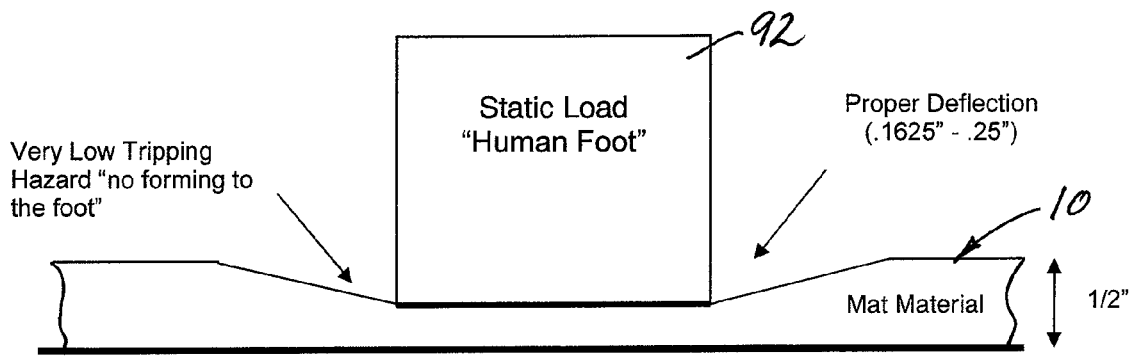

Fig. 8 "Load Displacement"
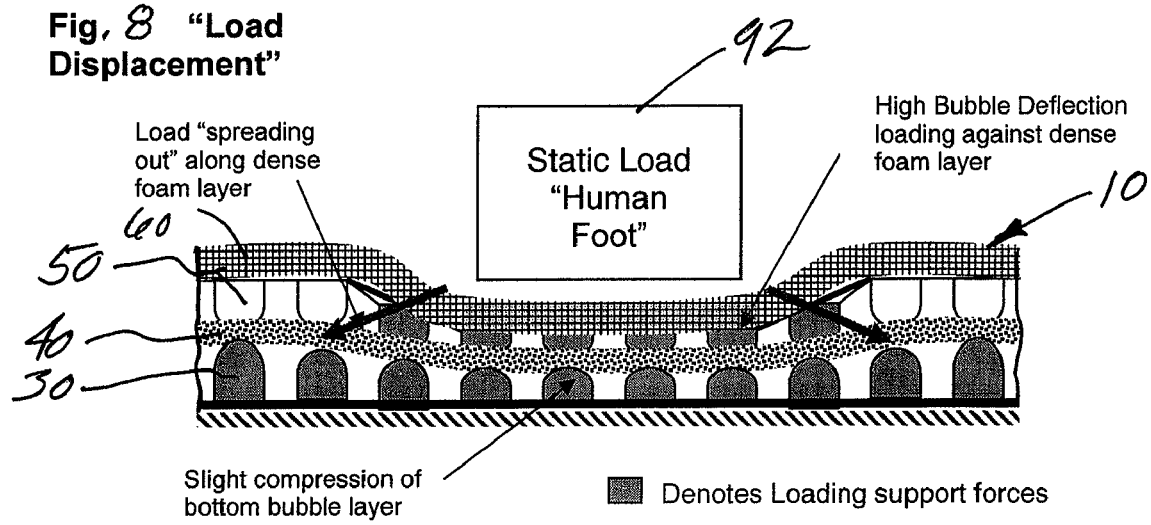
Fig. 9 "Multi-plane" Loading (Compression) Chart
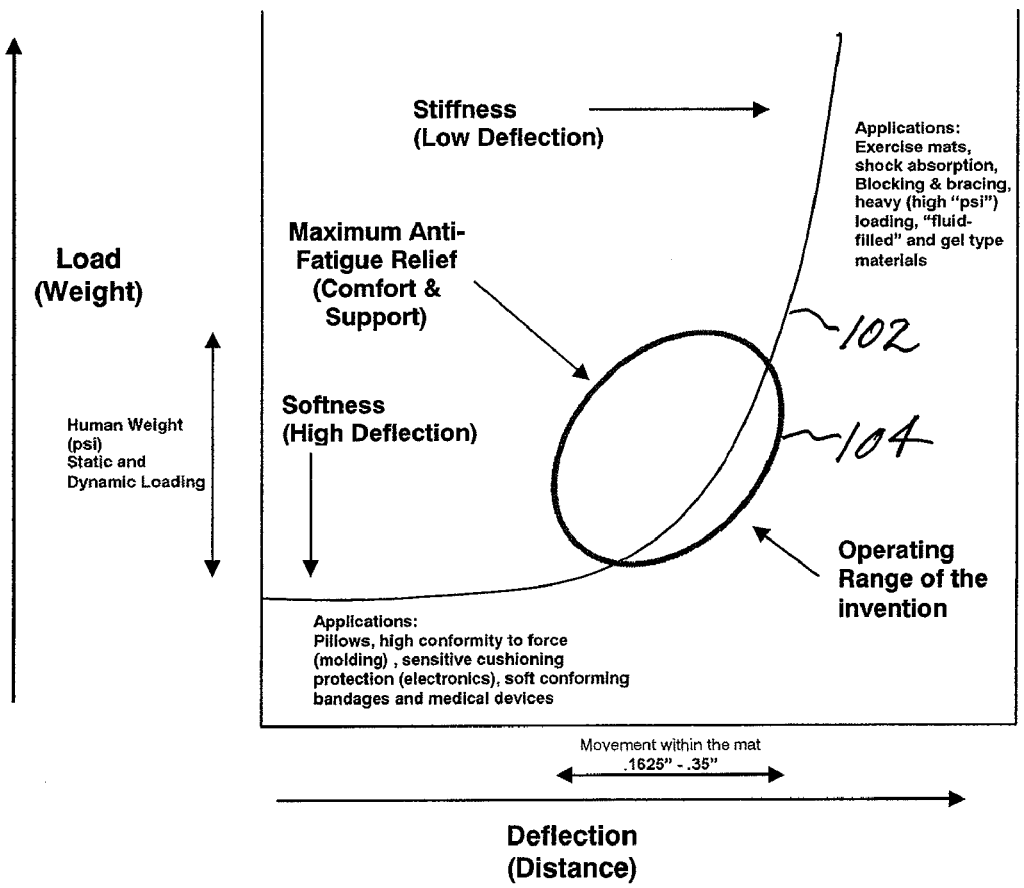

ERGONOMIC FLOOR MAT

CROSS-REFERENCE TO RELATED APPLICATION

This application is a continuation-in-part of the U.S. patent application Ser. No. 09/973,298 filed Oct. 9, 2001 now U.S. Pat. No. 7,192,631.

BACKGROUND OF THE INVENTION

The present invention relates generally to floormats and, more particularly, to an ergonomic, disposable, anti-fatigue floormat. Among other applications, this invention is directed to improving ergonomics in surgery or other human tasks that require prolonged static postural positioning such as standing in one location for prolonged periods. Specifically, mats of the present invention are designed to allow surgeons performing open surgical procedures, a method of significantly decreasing musculoskeletal workloads and long-term musculoskeletal fatigue during such surgical procedures.

It has been well documented through medical ergonomic studies that healthcare professionals who spend a significant amount of time in a static posture experience substantial stress to the musculoskeletal system. This stress is directly related to lower extremity fatigue with concurrent effects extending up the human body through the lower extremities, lumbar region, head and neck region, as well as shoulders and upper extremities. This static postural stress related fatigue phenomenon has been well documented by surgeons, dentists, as well as in nursing healthcare professionals who are assisting as part of the operative team.

Numerous types of floormats have been described for commercial and industrial uses. Mats have also been designed specifically for use in the operating room. Most all prior mat descriptions, however, have been for floor protection and/or to allow absorption of fluids. For example, U.S. Pat. No. 5,028,468 is directed towards a permanent surgical mat with a disposable covering. The permanent floormat described is a polyvinyl chloride foam mat, which is compressible. The outer disposable cover of the permanent mat is suggested to be polyethylene or other similar type polyester material, which then seals around the main nondisposable mat. Antistatic and/or anti-microbial solutions can be injected into this permanent mat. Despite the outer covering which is disposable, the permanent mat must be cleaned in accordance to HCFA (Health Care Finance Administration) and JCAHO (Joint Commission on Accreditation of Health Care Organizations) requirements creating a difficult situation. In addition, the polyvinyl chloride foam is a compressible material and offers limited ergonomic advantages. This has been demonstrated through the work of Cook (Journal Biomedical Engineering 1993, Volume 15, pp. 247) through EMG studies.

U.S. Pat. No. 5,173,346 describes a foldable sponge mat for surgical application. This mat was designed specifically for absorbing fluids from the operating room floor. This mat is composed of a cellulose-based material to allow for fluid absorption and was not designed for ergonomic properties. The mat was designed for permanent use. However, the mat apparently must be discarded following its expansion with the absorption of fluids.

U.S. Pat. No. 4,609,580 discloses another absorbent floormat not designed specifically for operating room use. Its applications were described for building entryways, laboratories, and hospitals where there is high traffic area likely to bring in water, dirt, and other contaminates. This disposable mat is not ergonomically designed.

Mats designed in ergonomic fashion for musculoskeletal relief have been described for the industrial setting. For example, U.S. Pat. No. 3,846,945 describes an anti-fatigue floormat composed of heavy rubber or plastic with interdigitating tongues around its perimeter allowing an interlocking connection with other mats for extended configurations. These are heavy duty, perforated permanent mats, which, due to problems with handling and sterility, are not applicable to the operating room environment.

Accordingly, there is a need for an ergonomically designed, completely disposable mat that specifically reduces musculoskeletal fatigue associated with prolonged static posturing such as those experienced during open operative procedures.

SUMMARY OF THE INVENTION

The present invention is designed to improve medical ergonomic stress patterns in, among other places, the operating theatre. A noncompressible surgical floormat with a high Indent Load Defection (ILD) has been designed, consisting of multiple layers of alternating laminated materials, including layers of noncompressible polyethylene and polypropylene closed cellular foam and bubble materials, to prevent complete compression while being stood upon by human beings. This mat has been designed to reduce the well documented occupational hazards for healthcare professionals while performing open surgical procedures as well as other medical and dental forms of patient care. These health risks are due to prolonged standing and awkward body positions secondary to static postural stress, which leads to significant musculoskeletal fatigue.

In addition, in a preferred embodiment, the surgical mat is specifically designed for use in the operating theatre and to be totally disposable. The materials and construction of the mat have been selected for their ergonomic efficiency as well as their relatively low costs to allow for usage in a disposable fashion. The disposability of the mat after a single use eliminates the problems associated with permanent-type surgical floormats, assuring elimination of contamination from one case to the next as well as assuring all JCAHO and HFCA operating room requirements. This mat is also designed in such a way to be anti-static, to allow its use around electrical equipment commonly employed in the operating room setting. The floormat can also have a tapered, beveled perimeter edge so that the mat cannot be easily kicked or scuffed to minimize tripping. A beveled perimeter edge also facilitates moving equipment over the mat, if necessary, although rolling equipment over the mat is not recommended. In addition, the bottom surface of the mat can have a low-tack adhesive material covering part or the entirety of the base, which allows for further adherence to a room floor such as an operating room floor. The floormat of the present invention can be simply disposed of with all other contaminated objects by the nursing staff at the conclusion of each case.

Preferably the mat is water-resistant and is not designed for absorbing bodily fluids or irrigants from the floor per se. While this anti-fatigue surgical floormat was designed for use by healthcare professionals in the operating theatre, its ergonomic characteristics may find applications in other private and/or commercial settings as well. This floormat may come in a variety of sizes and/or shapes to accommodate various surgical operating rooms or other environments.

It is therefore an object of the present invention to provide an ergonomic floormat.

It is another object of the present invention to provide an ergonomically designed surgical floormat whose purpose is to decrease musculoskeletal fatigue in human beings during prolonged static postural stress.

It is another object of the present invention to provide a surgical floormat intended for disposal use.

The present invention accomplishes these and other objects by providing a surgical mat offering significant ergonomic, musculoskeletal stress relief for, among others, surgeons, dentists and nursing healthcare professionals who are assisting as part of the operative team. In accordance with one aspect of the invention a noncompressible floormat system was designed utilizing a laminated construction of polyethylene and polypropylene closed cellular foam and bubble materials. This noncompressive floormat design allows specific anti-fatigue factors through dispersive noncompressive forces.

In another aspect of the present invention, the mats can also include more commonly recognized properties such as being anti-static which is an important feature when the mat is employed during use with electronic equipment. Additionally, mats of the present invention also can include anti-slip or skid properties such as by employing a low-tack adhesive material on the surface of the mat. This mat is also completely disposable and designed for one-time use only. While designed for the operating theatre, this mat may find application for commercial or private use as well.

In yet another preferred aspect of the invention, a surgical floormat is provided having a preferred embodiment of layer(s) of a non-foam, air bubble-shaped, closed cellular material which significantly increases the Indent Force Deflection (IFD) properties of the mat, maximizing its anti-fatigue characteristics.

In another preferred aspect of the invention, the surgical floormat comprises layer(s) of polypropylene foam with anti-static characteristics.

In another preferred aspect of the invention, a surgical floormat is provided which utilizes a polypropylene thin foam material as a covering to allow a high coefficient of friction. The properties of this material offer a slip resistant surface that is readily moldable, is heat resistant, and is able to accept printing and labels for informational data.

In yet another preferred aspect of the invention, the mat may be constructed by centering smaller layers on top of larger layers to create a gradual elevation (pyramiding effect) allowing for a beveled perimeter which reduces the potential tripping hazard associated with walking and working on a slightly elevated work space.

In yet another preferred aspect of the invention, the mat has an adhesive bottom layer for temporary positioning and repositioning of the mat reducing the potential for tripping and slippage during its use.

It will be appreciated by those skilled in the art that the materials of the preferred embodiments disclosed can be used in combination and in different quantities and orientation to allow for an ergonomically fatigue reducing mat for use in the operating theatre and that the mats of the present invention are not restricted to that use. For example, mats of the present invention, may also find wide application in the private commercial industrial setting where musculoskeletal relief from fatigue created by prolonged static postural stress can occur.

DESCRIPTION OF THE DRAWINGS

The above, as well as other, advantages of the present invention will become readily apparent to those skilled in the art from the following detailed description of a preferred embodiment when considered in the light of the accompanying drawings in which:

FIG. 5 is a schematic illustration of excessive mat deflection under static load;

FIG. 6 is a schematic illustration of too little mat deflection under static load;

FIG. 7 is a schematic illustration of preferred or proper mat deflection under static load;

FIG. 8 is similar to FIG. 7 and shows details of the mat according to the present invention; and FIG. 9 is a plot of load versus deflection showing a preferred operating range according to the present invention.

DESCRIPTION OF THE PREFERRED EMBODIMENT

Figure 3:
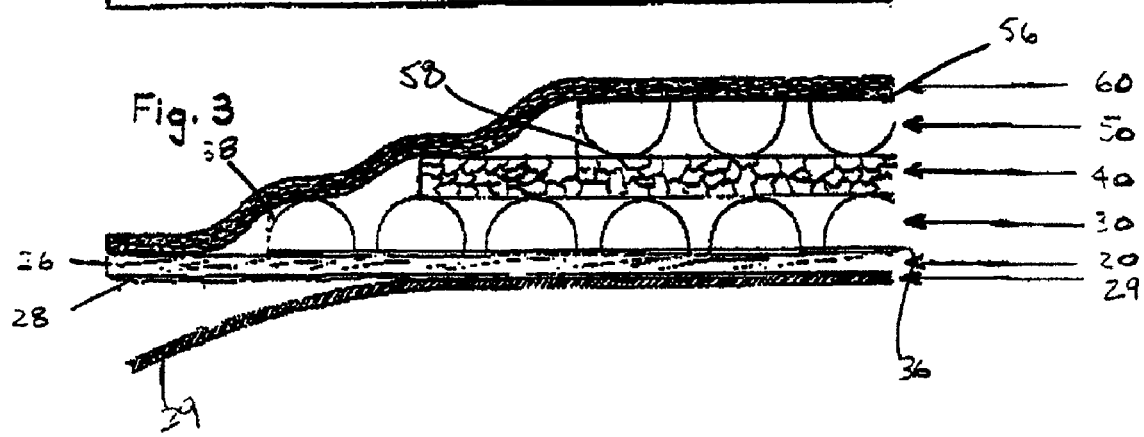
FIG. 3 is an enlarged partial cross-sectional view of a preferred embodiment and depicts a preferred layering construction as well as the optional preferred "pyramiding" effect for one edge of a mat constructed in accordance with a preferred embodiment, wherein the top layer covers each exposed lower lay.
Figure 4:
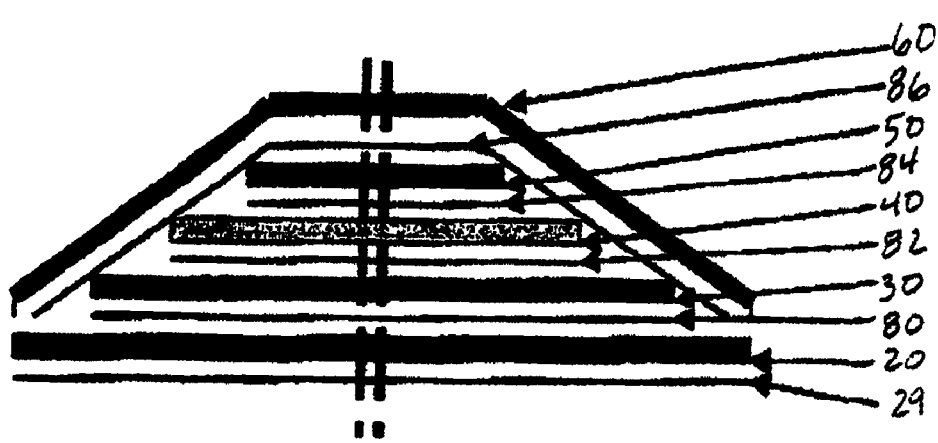
FIG. 4 is an enlarged, exploded cross-sectional view of a preferred embodiment showing the preferred positioning within the layering construction and the preferred adhesive layers that attaches each layer to the preferred adjoining layers.

The above described drawings illustrate a visual understanding of the preferred embodiments, preferred positioning and preferred materials of the invention. These drawings, while not to scale, do depict a dimensional view of preferred embodiments of the invention e.g., FIG. 1 is a preferred depth and style of invention, FIG. 2 is a top view of a preferred placement and shape of layers, FIG. 3 is a cross-sectional view depicting the preferred embodiments and layers, and FIG. 4 is a complete cross-sectional view depicting further embodiments of the invention in their preferred positions.

Preferred materials for mats of the present invention include those made of anti-static air cellular "bubble" shaped polyethylene based material, anti-static closed cellular polyethylene based foam material, and anti-static closed cellular polypropylene based foam material. These materials are utilized in a variety of layered constructions. A preferred laminating material 80, 82, 84 and 86 is utilized to bond the various layers together and a preferred low tack adhesive material 28 with a carrier sheet 26 form a laminated construction to create a first layer 20. The preferred low tack adhesive material has a removable liner (preferably a silicon coated paper) 29 so that the liner 29 can be easily removed and discarded before use and the floormat can be temporarily affixed to a typical flooring surface. The preferred material also allows for repositioning prior to use.

Figure 1:
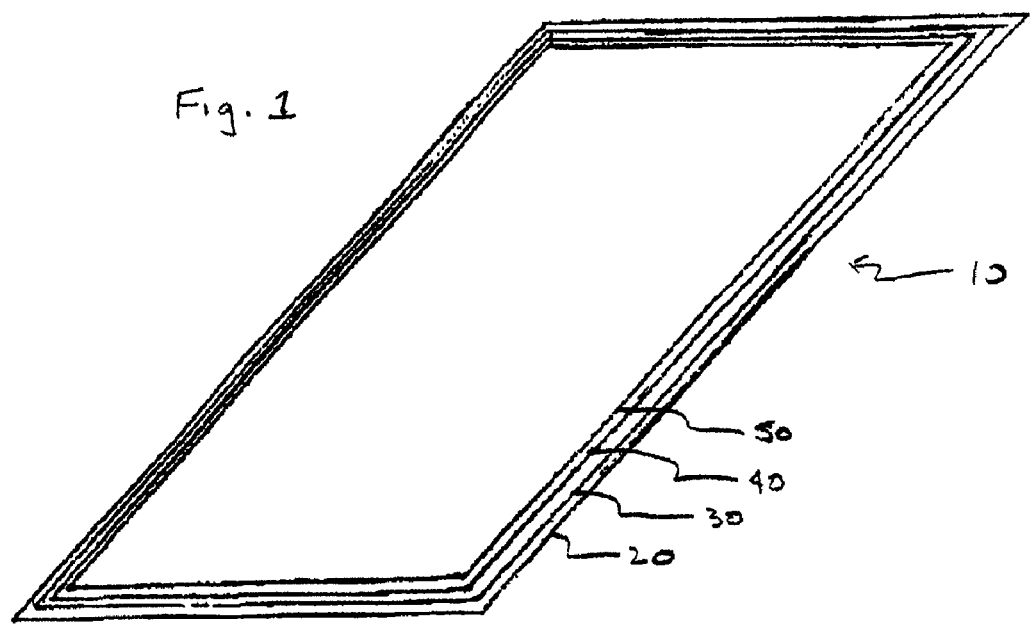
FIG. 1 is a perspective overview of a floormat of the present invention that represents the overall shape of one of the embodiments of the invention.

FIG. 1 illustrates, dimensionally, a generally rectangular floormat 10 (topside visible) and the possible "pyramiding" effect of the layering construction which provides a truncated pyramidal shape to the mat. As best illustrated in FIG. 1 and FIG. 2, the mat comprises several layers and starting with the base layer 20 each successive layer 30, 40, 50, is centered one layer on top of another to give a gradual elevation and create a symmetrical appearance on the length and width of the mat.

Figure 2:
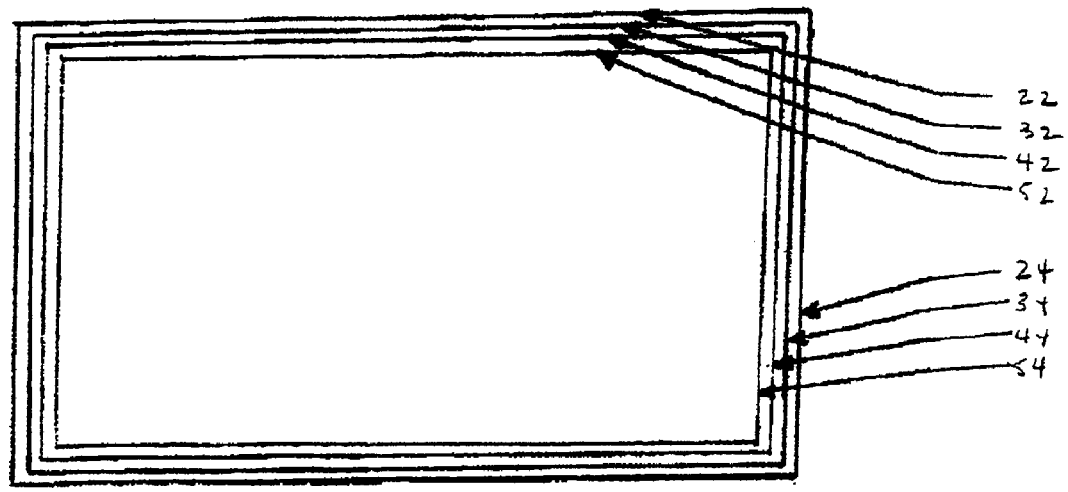
FIG. 2 is a top view of the floormat shown in FIG. 1 which shows, but is not limited to, the preferred positioning of each structural layer of the mat and the preferred "pyramiding" effect of the layers.

As best shown in FIG. 1 and FIG. 2, this preferred "pyramid" effect begins with the "floor side," base layer 20, shown as having an overall rectangular shape, with a length 22 and width 24 of the finished mat. The layers 30, 40, and 50, preferably decrease in overall length and width in each direction with respect to those of the layer 20, e.g. the layer 30 has a length 32 and a width 34, each of which is respectively dimensionally less than the length 22 and the width 24. The layer 40 has a length 42 and a width 44, each of which is respectively less than the length 32 and the width 34. The layer 50 has a length 52 and a width 54, each of which is respectively dimensionally less than the length 42 and the width 44. As best shown in FIG. 3 and FIG. 4, the mat 10 has a top, cover layer 60 affixed to the next layer 50 thereunder and the cover layer 60 is also preferably affixed to all subsequent lower exposed layers to appear to be "shaped" to these layers and to totally cover the complete top side of the mat.

Mats of the present invention can, of course, be constructed in different sequences, eliminating or adding layers of the preferred embodiments shown and describe herein for different performance results and costing advantages. It will also be appreciated that mats of the present invention also can be of any desired shape. For example, in addition to a rectangular shaped construction, mats can be of an oval construction, a circular construction, a hexagonal construction, an octahedral construction, etc., to name but a few other shapes.

Turning to FIG. 4, the base layer 20 comprises an adhesive material that is a low-tack adhesive with preferred adhesive ranges of from about 5 to about 100 ounces per inch of width (nominal), based on ASTM testing method (of adhesion to steel). Preferably the base 20 is constructed from a polyethylene or co-extruded polymer as the carrier sheet 26 having a thickness of about 0.002 to about 0.004 inches to which the low-tack adhesive 28 is attached. The carrier sheet 26 provides the mat 10 with added durability during its limited use and also acts as a carrier for the low tack adhesive 28. The adhesive material 28 and the carrier sheet 26 are protected by the removable liner sheet 29. This removable liner sheet 29 is preferably a silicone coated paper, for example 25# to 40# basis weight or other adequate material which either inherently provides or is nominally coated enough for a clean release from the low tack adhesive 28 while still able to remain on the adhesive prior to use.

The liner sheet 29 can be easily removed prior to use and is used to protect the adhesive layer 28 during fabrication, storage and shipping. The liner sheet 29 can be perforated, secured or otherwise constructed to facilitate removal of the liner sheet item desired.

The layer 30 is preferably comprised of a material that is an air "bubble" shaped closed cellular material with an inner air protection polymer barrier (preferred nylon or co-extruded polymer) layer to minimize the loss of air from the air cell. More preferably the layer 30 has anti-static properties. The preferred material is manufactured from, or to have, about a 0.002-0.003 inch thickness for a "flat" side 36 of the bubble material (bottom overall sheet thickness) and about a 0.004-0.005 inch thickness for a "bubble" side 38 of the bubble material (top overall sheet thickness). Other thicknesses of this air "bubble" cellular material may be employed as well. In the preferred construction of the mat 10, the bubble side 38 is positioned upward to face the bottom of the layer 40. The air "bubble" shaped cellular material comprising layer 30 preferably has less than a 10% thickness loss, based on a 0.5 pounds per square inch loading over 15 days utilizing a static test method of 10" times 10" material samples. Commercially available air "bubble" shaped cellular materials useful in the present invention include those offered by Sealed Air Corp. under the trademarks, Bubble Wrap, Air Cap, Poly Cap, Poly Cap Lite and Bubble Mask; those offered by Pactiv (formerly Astro-Valcour) under the trademarks, AstroSupra Bubble, Astro-Cell and Astro-Cell Plus; and those offered by Poly Air under the trademark Dura Bubble.

As shown in FIG. 4, the mat 10 includes the laminating adhesive 80 to affix the layer 20 to the layer 30. The preferred adhesive 80 is a synthetic elastomer, 22-24% solids, with adhesion to the polymer substrates of 2-10 pounds per inch, based on ASTM test methods for adhesives. The preferred method of construction is to apply the laminating adhesive 80 to both the top of the layer 20 and the bottom of the layer 30 for proper bonding. Additional laminating techniques may be used such as, by way of example and not limitation, heat bonding of the polymer layers and utilizing laminating polymers to bond the layers 20 and 30 together. In an alternative embodiment of the invention, the low-tack adhesive 28 can be applied directly to the bottom of the layer 30 without the use of the carrier sheet 26. In yet another alternative embodiment of the invention, the layer 20 can be eliminated and or replaced with anti-static friction inducing ribs, nubs or the like to impede movement of the mat 10 when in use.

The layer 40 is preferably comprised of a material that is closed cellular polyethylene foam with a preferred nominal density of about 1.7 to 2.2 pounds per cubic foot and a preferred nominal thickness of about 0.125 inches. More preferably the closed cellular polyethylene foam of the layer 40 has anti-static properties and the anti-static surface resistivity properties would preferably have less than $10^{13}$ OHMS/Square at 73° F., 15% R.H. based on testing method ASTM-D-257 and static decay properties of a maximum of 2 seconds under testing Method 4046 of Fed. Test Method STD 101C. Commercially available closed cellular polyethylene foam materials useful in the present invention include those offered by Sealed Air under the trademarks Cellu Cushion, Cellu Plank and Cell Aire; those offered by Pactiv under the trademarks Astro foam and Stratocel; and those offered by Poly Air under the trademark Star foam.

Preferably the laminating adhesive 82 is used to affix the layer 30 to the layer 40 in a similar manner as the adhesive 80 secures the layer 20 to the layer 30. Preferably the adhesive 82, similar to the adhesive 80, is a synthetic elastomer, 22-24% solids, with adhesion to the polymer substrates of 2-10 pounds per inch, based on ASTM test methods for adhesives. The preferred method of construction is to apply the laminating adhesive 82 to the top of the layer 30 and the bottom of the layer 40 for proper bonding. Additional laminating techniques may be used such as, by way of example and not limitation, heat bonding of the polymer layers and utilizing laminating polymers to bond the layers 30 and 40 together.

The layer 50 is preferably comprised of an air "bubble" shaped closed cellular material with an inner air protection polymer barrier (preferred nylon or co-extruded polymer) layer to minimize the loss of air from the air cell. More preferably the layer 50 has anti-static properties. The layer 50 is similar to the layer 30. As for the layer 30, the preferred material for the layer 50 is manufactured from, or to have, about a 0.002-0.003 inch thickness for a "flat" side 56 of the bubble material (bottom overall sheet thickness) and about a 0.004-0.005 inch thickness for a "bubble" side 58 of the bubble material (top overall sheet thickness). Other thicknesses of this air "bubble" cellular material may be employed as well. In the preferred construction of the mat 10, the bubble side 58 is positioned downward to face the top of the layer 50.

This air "bubble" shaped cellular material would preferably have less than 10% thickness loss, based on a 0.5 pounds per square inch loading over 15 days utilizing a static test method of a 10" times 10" material sample.

The mat 10 also preferably includes the laminating adhesive 84 to affix the layer 40 to the layer 50 in a manner similar to the use of the adhesive 82 to secure the layers 30 and 40, and the adhesive 80 to secure the layers 20 and 30. Preferably the adhesive 84, similar to the adhesives 80 and 82, is a synthetic elastomer, 22-24% solids, with adhesion to the polymer substrates of 2-10 pounds per inch, based on ASTM test methods for adhesives. The preferred method of construction is to apply laminating adhesive to the top of the layer 40 and to the bottom of the layer 50 for proper bonding. Additional laminating techniques may be used such as, by way of example and not limitation, heat bonding of the polymer layers and utilizing laminating polymers to bond the layers 40 and 50 together.

The mat 10 preferably includes the cover layer 60. The cover layer 60 is preferably comprised of an anti-static polypropylene closed cellular foam, with a preferred nominal density of about 0.5-0.7 pounds per cubic foot and a preferred nominal thickness of about 0.0625 inches. More preferably the material also exhibits a heat resistance of up to 310° F. (melting point) and has an inherent high coefficient of friction, offering a non-slip surface for the mat. The anti-static surface resistivity properties would preferably have less than $10^{13}$ OHMS/Square at 73° F., 15% R.H. based on testing method ASTM-D-257 and static decay properties of a maximum of 2 seconds under testing Method 4046 of Fed. Test Method STD 101C. Commercially available polypropylene closed cellular foam materials useful in the present invention include those offered by Pactiv under the trademark Microfoam.

As best shown in FIG. 3 and FIG. 4, the cover layer 60 preferably not only covers the layer 50 but also covers the intermediate layers 40 and 30 and the base layer 20, especially in the preferred embodiment where the layers 50, 40 and 30, and optionally the layer 20, are in a pyramid construction and provide the mat 10 with one or more beveled edges.

The mat 10 also preferably includes a laminating adhesive to affix the layer 60 to the layer 50 and, where appropriate to the layers 40, 30 and 20. Similar to the adhesives 80, 82, and 84, the adhesive 86 is preferably a synthetic elastomer, 22-24% solids, with adhesion to the polymer substrates 2-10 pounds per inch, based on ASTM test methods for adhesives. In the preferred construction of the mat 10, the laminating adhesive 86 is applied to the bottom of the cover 60 and to the top of and/or sides of the other surfaces facing the cover 60 for proper bonding. Additional laminating techniques may be used such as, by way of example and not limitation, heat bonding of the polymer layers and utilizing laminating polymers to bond the cover layer 60 to the layer 50 and to other underlying surface sought to be covered.

The unique design of the mat 10 creates a "multi-plane load displacement" device. The basic premise is that as weight is applied to the surface of the material, the material would have comfort (a.k.a. "pillow effect") for extended static posturing. As more weight is applied (i.e., rocking & shifting of weight, shoe types and dimensions, equipment moving on and off the mat, etc.) the material types, the specific positioning of the materials and the materials orientation within the mat, would steadily resist the increasing weight for stability and maintaining volume integrity or support (a.k.a., not "bottoming out", see FIG. 5). This multi-plane load displacement takes place within the mat 10 according to the present invention and is due to the unique combination, position and orientation of these materials, allowing for both comfort and support to coexist, specifically for the purpose of static human posturing.

In FIG. 5, a mat 90 having excessive deflection (76% to 100%) under a static load 92 such as a human foot bottoms out in an area 94 under and around the foot and provides no material support with only minimal anti-fatigue relief. At the other end of the spectrum is a mat 98, shown in FIG. 6, that has too little or minimal deflection. For example, a deflection in a range of 0% to 29% in an area 100 under the static load 92 results in "no comfort".

The "multi-plane load displacement" concept (or XYZ axis load displacement) was the genesis of the resulting unique anti-fatigue properties inculcated within the mat 10. Multi-plane load displacement allowed for highly effective anti-fatigue relief within specific ranges of material penetration (specific levels of deflection into the material) such as 30% to 75% as shown in FIG. 7. The empirical material testing indicated precisely what the subjective human evaluation testing provided, in that when the lighter forces (comparable to a lower range of human weight) were applied to the mat 10, the greatest percentage of deflection occurred allowing the foot to settle into the mat without forming around the foot (which was determined as a tripping hazard). This range was on average 0.1625" (32.5%) to 0.25" (50%) in total penetration of the 0.5" thick mat 10 at normal static loads and consisted of mainly vertical force displacement (or the X & Y axes), movement straight up and down within the mat (see FIGS. 7 and 9).

As the weight increased within the human weight range, the unique material construction began to displace the weight to mainly horizontal force displacement (or the Z axis) as shown in a curve 102 in FIG. 9. This phenomenon creates a "spreading" outward (or suspension) in the horizontal dimension (Z axis) beyond the normal loading in the vertical dimension (X & Y axes). This unique construction, combination and orientation allowed for both vertical and horizontal force displacement, which is critical to the mat performance and uniqueness from other materials. With other products designed to offer comfort with higher displacement (greater than 0.35" in penetration), the material became unstable, making it difficult to balance evenly on the material and would easily "bottom out". This high movement into the material became a tripping hazard due to its forming around the foot (see 96 in FIG. 5) and weight displacement was concentrated on the outside edge of the foot (rather than more evenly across the bottom of the foot), creating discomfort for extended static posturing. Conversely, some materials rigidly supported the weight for shock resistance and bracing (support), they offered very little deflection (less than 0.1625", see 100 in FIG. 6) or comfort for anti-fatigue relief.

Empirically, the results proved that for maximized, anti-fatigue relief for static human posturing, the preferred multi-plane load displacement was a 65%/35% (+/−5%) relationship with displacement (movement into the mat) and force (or the weight applied). This indicated that with 35% of the nominal force (or weight), the anti-fatigue material must deflect approximately 65% of its deflection capability (based on the entire material deflection of the product). These are the empirical results for maximum anti-fatigue relief. For the proper stability factors and material integrity factors, the remaining material deflection capability must withstand the higher force of environmental activity of the 65% additions of force to the remaining 35% of the deflection capability. Additionally, this normal and working condition deflection must fall into the range of 0.1625" (32.5%) to 0.25" (50%) for a 0.5" thick mat, so not to increase the tripping hazard of the material in use and maximize anti-fatigue relief (see FIG. 9). Hence, the specific deflection ranges (static load distance into the material) and the ability for restrictive movement (dynamic load) without "bottoming out" or any substantial additional deflection is critical to maximize anti-fatigue relief (full operating range of 0.1625" to 0.35" shown as area 104 in FIG. 9).

The "multi-plane load displacement" uniqueness of this invention was derived through the unique position, layering technique and materials used. This technique allows for optimizing the normal working condition weight with proper uniform deflection and maximizing the anti-fatigue relief effects of the mat. The range or distribution of human weight is available from many public sources such as the U.S. Department of Health & Human Services. Thus, the mat according to the present invention can be designed for an average human weight, or can be custom designed for the actual weight of a specific user. However, static conditions are only temporary in working environments so the invention had to include a higher loading capability due to constant movement, weight shifting and potentially very high loading conditions (i.e., equipment placed on the mat, equipment moved over the mat, etc.). This was compensated by the unique positioning and materials to "spread out" these loading forces "horizontally." Without this technique, the primary loading support is "vertical" creating either too stiff of material or to soft, both conditions offering no or little anti-fatigue relief.

As shown in FIG. 8, the "multi-plane load displacement" of the mat 10 has been achieved by utilizing the two top layers 60 and 50 that offer higher deflection, allowing for the "comfort" range to be achieved. These layers are fully laminated together, intentionally with the bubble side facing downward, allowing for a 100% bonded area between the top layer 60 and the second layer 50. This will ensure the materials will move together, as if they were one material and prevent the material from "forming around the foot", avoiding any tripping hazard. The load is now transferred from the second bubble layer 50 to the higher density flexible foam third layer 40. This layer 50 is bonded at the "rounded portion" of the bubble to the high density flexible foam 40. This creates elasticity between these two layers while simultaneously transferring the load over a larger surface. This positioning creates an elasticity which allows for internal deflection horizontally and vertically, forcing a greater support of the load to be both "suspended (as the weight is spread out) and vertically supported. This effect creates stability support within the mat 10 (minimal rocking and stability against swaying), by offering a more even support against the base of the foot (even, stable loading) rather than just the edges of the foot (unstable loading). As more weight is placed on the mat 10, the greater the suspension effect or "spreading" of the load. This combination of layers, their position, and the orientation for bonding, optimizes the deflection over a wide range of loading conditions that is unique to this invention. It was determined that "fluid-filled or gel type" material offer good "shock" resistance, but significantly poorer anti-fatigue relief due to improper material deflection, non-uniform loading surfaces, and not meeting the empirical anti-fatigue conditions stated above. Other material combinations (of the invention's materials), orientations and polymeric layers created either too much deflection (too soft) or too little deflection (too stiff), minimizing the anti-fatigue relief.

The top layer 60 of material has been designed to offer a non-slip surface that is a result of the material's higher levels of coefficient of friction. This "resistance" factor to slipping, the materials low IFD (Indent Force Deflection) and the materials thin layer allows for the shoe to better "grip" the mat in many environmental conditions. The "softer", thinner material will accommodate many tread patterns on the bottom of shoes which allows it to grip even under flooded conditions. This coefficient of friction average range over multiple surfaces is approximately 0.5425. Other materials have a lower COF, have a lower IFD, and absorb water changing the surface properties of the materials and even multiple combinations of all of these conditions. This creates serious slipping hazards for the working environment.

While the preferred embodiments of the invention have been shown and described it will be apparent to those skilled in the art that changes and modifications may be made thereto without departing from the spirit of the invention. For example, variations in the number of layers, the thickness of one or more of the layers, proportion and properties of the materials of the layer, and overall design of the mat may vary without departing from the spirit of the invention, the scope of which is defined by the appended claims.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A mat for decreasing musculoskeletal fatigue in humans during prolonged static postural stress comprising:
   a pair of bubble layers formed of an air bubble shaped closed cellular material, each said bubble layer having a flat side and a bubble side;
   an intermediate layer formed of closed cellular foam material wherein said bubble sides of said bubble layers are positioned to face opposite sides of said intermediate layer;
   a base layer; and
   a cover layer wherein said bubble layers and said intermediate layer are positioned between said base layer and said cover layer and wherein said bubble layers deflect under a load applied by human posturing to provide a total deflection in a direction of application of the load in a range of 30% to 75% of an unloaded height of the mat.

2. The mat according to claim 1 wherein said bubble layers are formed from an anti-static air bubble shaped closed cellular material.

3. The mat according to claim 1 wherein said intermediate layer is formed from one of a closed cellular polyethylene foam material and a closed cellular polypropylene foam material.

4. The mat according to claim 1 wherein said base layer comprises a polyethylene carrier sheet having an upper surface and a lower surface and including a low-tack adhesive carried on said lower surface of said carder sheet.

5. The mat according to claim 4 including a removable liner releasably attached to said low-tack adhesive.

6. The mat according to claim 4 wherein said bubble layers, said intermediate layer, said base layer and said cover layer are adhered together by a laminating adhesive.

7. The mat according to claim 1 wherein said bubble layers and said intermediate layer are dimensioned to provide the mat with a truncated pyramidal shape having a beveled perimeter.

8. The mat according to claim 1 wherein during application of approximately 35% of the load the deflection in the direction of application of the load is approximately 65% of the unloaded height of the mat.

9. The mat according to claim 1 where said cover layer has an average coefficient of friction of approximately 0.5425.

10. A mat for decreasing musculoskeletal fatigue in humans during prolonged static postural stress comprising:
- a pair of bubble layers formed of an air bubble shaped closed cellular material, each said bubble layer having a flat side and a bubble side;
- an intermediate layer formed of a closed cellular foam material wherein said bubble sides of said bubble layers are positioned to face opposite sides of said intermediate layer;
- a base layer; and
- a cover layer formed of an anti-static closed cellular foam material wherein said bubble layers and said intermediate layer are positioned between said base layer and said cover layer, and wherein said bubble layers deflect under a load applied by human posturing to provide a deflection in a direction of application of the load of approximately 65% of an unloaded height of the mat in response to the application of approximately 35% of the load.

11. The mat according to claim 10 wherein said bubble layers deflect under the load to provide a total deflection in the direction of application of the load in a range of 30% to 75% of the unloaded height of the mat.

12. The mat according to claim 10 wherein said bubble layers and said intermediate layer deflect in a vertical direction during the application of an initial portion of the load and spread the load horizontally during the application of a final portion of the load.

13. The mat according to claim 10 wherein said bubble layers, said intermediate layer, said base layer and said cover layer are adhered together by a laminating adhesive.

14. The mat according to claim 13 wherein said bubble layers and said intermediate layer are dimensioned to provide the mat with a beveled perimeter.

15. A multi-layer mat for decreasing musculoslceletal fatigue in humans during prolonged static postural stress comprising: at least two layers of material having a deflection characteristic in a vertical direction during the application of a human posturing load to the mat, wherein during application of approximately 35% of the load, the deflection in the direction of application of the load is approximately 65% of the unloaded height of the mat wherein said at least two layers include a pair of bubble layers formed of an air bubble shaped closed cellular material, each said bubble layer having a bubble side, and including an intermediate layer formed of closed cellular foam material wherein said bubble sides of said bubble layers are positioned to face opposite sides of said intermediate layer.

16. The mat according to claim 15 wherein said at least layers are dimensioned to provide the mat with a truncated pyramidal shape having a beveled perimeter.

17. The mat according to claim 15 wherein a first one of said at least two layers is formed of a first material having a first deflection characteristic in the vertical direction dining the application of the load to the mat and a second one of said at least two layers is formed of a second material having a second deflection characteristic in the vertical direction during the application of the load to the mat, said second deflection characteristic providing less deflection than said first deflection characteristic.

18. The mat according to claim 17 wherein said first material has less than a 10% thickness loss based on a 0.5 pounds per square inch loading over 15 days utilizing a static test method of 10"×10" material samples, said second material has a density in a range of 1.7 to 2.2 pounds per cubic foot.

19. The mat according to claim 15 wherein said at least two layers deflect in a vertical direction during the application of an initial portion of the load and spread the load horizontally during the application of a final portion of the load.

20. The mat according to claim 15 wherein said at least two layers deflect under the load applied by human posturing to provide a total deflection in a direction of application of the load in a range of 30% to 75% of an unloaded height of the mat.

* * * * *